United States Patent [19]

Grütter et al.

[11] Patent Number: 5,330,627
[45] Date of Patent: Jul. 19, 1994

[54] THERMOSETTING COATING COMPOSITIONS AND THEIR USE

[75] Inventors: Roland Grütter, Wuppertal; Reiner Böhmert, Haan; Rolf Reinecke, Wiesbaden, all of Fed. Rep. of Germany

[73] Assignee: Herberts G.m.b.H., Wuppertal, Fed. Rep. of Germany

[21] Appl. No.: 119,324

[22] Filed: Sep. 9, 1993

Related U.S. Application Data

[63] Continuation of Ser. No. 983,624, Nov. 30, 1992, abandoned, which is a continuation of Ser. No. 826,690, Jan. 23, 1992, abandoned, which is a continuation of Ser. No. 377,529, Jul. 10, 1989, abandoned.

[30] Foreign Application Priority Data

Jul. 13, 1988 [DE] Fed. Rep. of Germany ....... 3823731

[51] Int. Cl.$^5$ ............................................ C25D 13/10
[52] U.S. Cl. .............................. 204/181.4; 204/181.6; 204/181.7; 524/901; 523/404; 523/406; 523/407; 523/408; 523/409; 523/410; 523/411; 523/412; 523/413; 523/414; 523/415; 427/409; 427/410
[58] Field of Search ............... 204/181.4, 181.6, 181.7; 524/901; 523/404, 1, 415; 427/409, 410

[56] References Cited

U.S. PATENT DOCUMENTS

| | | | |
|---|---|---|---|
| 4,442,247 | 4/1984 | Ishikura | 204/181.7 |
| 4,539,348 | 9/1985 | Gajria | 523/412 |
| 4,869,796 | 9/1989 | Kanda | 204/181.7 |

*Primary Examiner*—Kathryn Gorgos
*Assistant Examiner*—Kishor Mayekar
*Attorney, Agent, or Firm*—Schweitzer Cornman & Gross

[57] ABSTRACT

A thermosetting coating composition containing

A) one or more binders convertible into liquid or dissolved form at least at the curing temperature and containing acidic groups, basic groups or ionic groups of similar charge, B) one or more binders convertible into liquid or dissolved form at least at the curing temperature and containing basic groups where (A) contains acidic groups, acidic groups where (A) contains basic groups or ionic groups of like charge opposite to the charge of the ionic groups of (A), binder (B) being noninterdiffusible under storage and application conditions, but interdiffusible with binder (A) under hardening conditions, and C) optionally standard solvents, pigments and/or typical paint auxiliaries and/or additives which do not lead to any interdiffusion of the binders A) and B) under storage and application conditions, and a process for the production of coatings by application of the coating composition and subsequent thermal curing.

6 Claims, No Drawings

THERMOSETTING COATING COMPOSITIONS AND THEIR USE

This is a continuing application of U.S. Ser. No. 983,624, filed on Nov. 30, 1992, which is a continuing application of U.S. Ser. No. 826,690, filed on Jan. 23, 1992, which is a continuing application of U.S. Ser. No. 377,529, filed on Jul. 10, 1989, all now abandoned.

FIELD OF THE INVENTION

This invention relates to thermosetting coating compositions based on at least two binders which are incompatible at the storage and application temperature and which contain ions of different charge, but lead to interdiffusion under thermal hardening conditions. The coating compositions are suitable for various methods of application, including for example spread coating, spray coating, dip coating and electrodeposition coating, with subsequent hardening by baking.

BACKGROUND OF THE INVENTION

The production of anionic and cationic ionomers is known. It is also known from the literature that an insoluble mass precipitates from a mixture of a solution of cationic ionomers with a solution of anionic ionomers ("RECENT ADVANCES IN ION-CONTAINING POLYMERS" by M. F. Hoover and G. B. Butler, J. Polymer Sci., Symposion No. 45, page 16). However, ionomers such as these have not hitherto been considered for application in paint technology. Copolymerisates are described in FR patents 1 493 043, 1 493 044, 1 493 045 and 1 493 046, which are obtained by precipitation of anionic and cationic polymers by mutual neutralisation. The thus prepared copolymerisates can be used for different purposes such as forming of films, preparation of fibers amd for preparation of coatings.

In industry, workpieces are mainly painted with coating compositions which, after application, are cured by heating to temperatures of 80° to 200° C. in baking ovens. In chemical terms, the cured process generally involves crosslinking of the binder system.

Self-crosslinking and externally crosslinkable binder systems which cure by chemical reactions are known. The functional groups which react during crosslinking may be hydroxyl groups, methylol groups, amino groups, epoxy groups, masked isocyanate groups and acetal groups. Physiologically harmful cleavage products are often formed during such chemical curing processes. In addition, heavy metal compounds sometimes have to be used as catalyst. The chemical crosslinking of lacquer binders by stoving on the surface of a workpiece is basically difficult and complicated because very little liberty is available under the given conditions for controlling and modifying the organic reaction.

The problem addressed by the present invention is to provide binder systems or coating compositions which can be cured by baking and of which the crosslinking is easy to control without the formation of cleavage products and without any need for cured catalysts, particularly heavy metal catalysts.

DESCRIPTION OF THE INVENTION

It has been found that this problem can be solved by the provision according to the invention of thermosetting coating compositions containing a binder based on A) at least one binder convertible into liquid form at least at the curing temperature and containing acidic, basic or ionic groups and B) at least one binder which is convertible into liquid form at least at the curing temperature and contains basic, acidic or ionic groups of opposite charge to the ionic groups of A) and which is only interdiffusible with the binder A) at the curing temperature, B) containing basic groups where A) contains acidic groups and containing acidic groups where A) contains basic groups, wherein at least one of the binders (A) and (B) is present in solid, particulate form under application and storage conditions.

During curing by baking, the binder components A) and B) melt and diffuse into one another. This results in crosslinking, for example through linkage of the functional, for example oppositely charged, ionic groups of A) and B), and hence in purely physical crosslinking of the two binder components. There is no need for a chemical reaction that would be difficult to control, nor is there any need to use catalysts, nor are there any of the unwanted reaction products formed in conventional covalent crosslinking.

Accordingly, the present invention relates to a completely new kind of thermosetting coating compositions consisting of at least two acidic, basic or ionic binders (A) and (B), binder (A) containing basic, acidic or oppositely charged ionic groups compared with binder (B) with no possibility of binder (A) interdiffusing with binder (B) under storage and application conditions. The binders only melt on heating.

The binder components (A) and (B) are prevented from interdiffusing after mixing by the fact that binder (A) is incompatible with binder (B) at room temperature.

The compatibility of various binders is normally understood to mean the possibility of completely homogeneous mixing of the binders. Accordingly, incompatibility means that it is not possible to obtain a completely homogeneous mixture.

This incompatibility may be achieved in various ways, for example by the structure of the molecule in the binder, by encapsulation and by different glass transition temperatures of binders. According to the invention, for example, one of the binders (A) and (B) may be present in solid form and the other in liquid or dissolved form. Mutual dissolution of the binders (A) and (B) should be avoided.

Another possibility is for both binder components (A) and (B) to be present in solid form.

In both the above cases, the solid binders are preferably present in particle form and preferably have a particle size of from 0.05 to 15 μm.

The interdiffusion of the binders (A) and (B) under storage and application conditions is advantageously prevented by the fact that the glass transition temperature (Tg), as measured by differential scanning calorimetry (DSC), of at least one of the binders (A) or (B) is in the range from 40° to 250° C., preferably in the range from 50° to 50° C. and more preferably in the range from 50° to 130° C. The glass transition temperature of the other binder (B) or (A) may be below these values or may assume the same values. Where the values are the same, no interdiffusion occurs. Where the values are lower, there should be no mutual dissolution or dissolution of the two components in the solvents and/or plasticizers used.

It is of course possible and may be of advantage to use a combination of two or more binders as binder (A) and/or binder (B), providing they comply with the definition of binder (A) or (B). The binder components (A) and (B) contain ionic groups of opposite charge to such an extent that mutual neutralization occurs with effective linkage or crosslinking of the two components; alternatively, they are mixed in corresponding quantities by weight.

Thus, binder (B) for example contains acidic groups where it is combined with a basic binder (A) or basic groups where it is combined with an acidic binder (A). Binder (B) must be formulated in such a way that interdiffusion with binder (A) is avoided. The binders (A) or (B) may be synthetic resins, natural resins or modified resins containing basic or acidic groups, for example modified epoxy resins, polymers of acrylic compounds or of acrylic compounds and styrene and/or styrene derivatives, polybutadiene resins, maleate oils, polyesters, alkyd resins, polyurethanes, polyaminoamide resins, modified epoxide/carbonic acid/amine reaction products, modified Mannich bases of bisphenol A, providing they contain a sufficient number of ionic groups. Acrylic compounds are also understood to include 1-alkyl acrylates, such as for example methacrylic, butacrylic and 2-ethyl hexacrylic compounds.

The binders (A) and (B) may contain as basic or cationic groups primary, secondary and/or tertiary amino groups containing aliphatic, cycloaliphatic and/or aromatic substituents, sulfonium and/or pyridinium and/or pyridine groups, phosphonium groups; and as acidic or anionic groups carboxyl groups, sulfonic groups, phosphonic acid groups and/or phenolic hydroxyl groups.

Binders containing carboxyl groups, sulfonic acid groups, phosphonic acid groups, phenolic hydroxyl groups, amino groups, pyridinium groups and pyridine groups are preferably used.

Examples of cationic or anionic binders suitable for use in accordance with the invention are given in the following. Cationic or anionic groups are generally understood to include basic or acidic groups which may be converted into cations or anions. In the interests of clarity, these examples are divided into A) cationic (or basic) or anionic (or acidic) binders which may be present in liquid, dissolved or solid form (for example particle form) in the binder system or coating composition and B) cationic (or basic) or anionic (or acidic) binders which may be used, for example, as oppositely charged binders together with the examples for (A) and which are preferably present in solid form (for example particle form) in the binder system or coating composition.

The following are examples of the binders which may be used for (A):

polyaddition, polycondensation and/or polymerization products having a number average molecular weight in the range from 300 to 10,000 g/mol and preferably in the range from 300 to 5,000 g/mol. They contain anionic or cationic groups as functional groups. They may contain as cationic groups, for example, primary, secondary and/or tertiary amino groups and/or quaternary ammonium groups containing aliphatic, cycloaliphatic and/or aromatic substituents, pyridinium and/or pyridine groups. They may also contain sulfonium and/or phosphonium groups, as described in EP-A 59 895. They may contain as anionic groups, for example, carboxyl groups, sulfonic acid groups, phosphonic acid groups and/or phenolic hydroxyl groups. It is preferred to use binders (A) containing either amino groups, quaternary ammonium groups and/or pyridine groups and/or pyridinium groups or carboxyl groups, sulfonic acid groups, phosphonic acid groups and/or phenolic hydroxyl groups. The resin component of these binders may be, for example, an epoxy resin, acrylate or polyaminoamide.

Examples of binders containing cationic groups are known as amino-group-containing, modified epoxy resins, of the type described for example in EP-A 82 291, page 5, line 21 to page 7, line 15, and in EP-A 66 859, page 5, line 1 to page 7, line 7. They are prepared by reaction of epoxy resins with primary or secondary amines. The diketimine of diethylenetriamine may advantageously be reacted as secondary amine with the epoxy resin. It is known that these binders may also be prepared in several stages via intermediate products for the formation of sequential binders (EP-A 66 859, page 20, Example A6). In this context, epoxy resins are understood to be any polycondensates, polymers and polyadducts bearing reactive epoxide groups, such as the reaction products of polyphenols, for example bisphenol A and novolak, with epichlorohydrin and the copolymers or homopolymers prepared using monomers containing epoxide groups, for example using glycidyl (meth)acrylate.

To introduce amino groups into binder (A), it is even possible to use aminoisocyanates which may be reacted with the hydroxyl groups of a resin, for example an epoxy resin, as described in DE-A 27 07 405.

Quaternary ammonium groups may be introduced in known manner, for example by reaction of epoxy groups with salts of tertiary amines.

Other binders containing amino groups suitable for use as binder (A) are, for example, the reaction products of dimeric and/or trimeric fatty acids with diethylenetriamine and/or ethylenediamine, which are known as polyaminoamides. Binders containing amino groups are also obtained by homopolymerization or copolymerization of unsaturated amines, for example dimethylaminoacrylate.

Binders containing anionic groups suitable for use in accordance with the invention are known, for example as carboxyl-group-bearing fatty oils, synthetic oils, fatty-acid- or oil-modified alkyd resins, polyesters, modified natural resins, acrylate resins and modified epoxy resins. Fatty oils bearing carboxyl groups are prepared, for example, from linseed oil, dehydrated castor oil, wood oil and/or soybean oil by reaction with maleic acid or maleic anhydride and are known as maleate oil. Synthetic oils bearing carboxyl groups may be produced from polybutadiene oil and maleic acid or maleic anhydride. It is also possible in accordance with the invention to use modified natural resins, for example the reaction product of colophony and maleic anhydride (known as maleate resin). Suitable modified epoxy resins containing carboxyl groups are obtained, for example, by reaction of epoxy resins of bisphenol with epichlorohydrin with water, monocarboxylic acids, ammonia or amines to form products free from epoxide groups and then with anhydrides of polybasic organic acids, as described in DE-A 15 20 210 and DE-A 15 20 219.

Examples of particularly preferred binders (A) are given in the following:

The particularly preferred binders of component (A) have a number average molecular weight of 300 to 5,000/mol and contain on average at least four functional groups in the molecule. They are, for example, polyglycidyl ethers corresponding to the following general formula

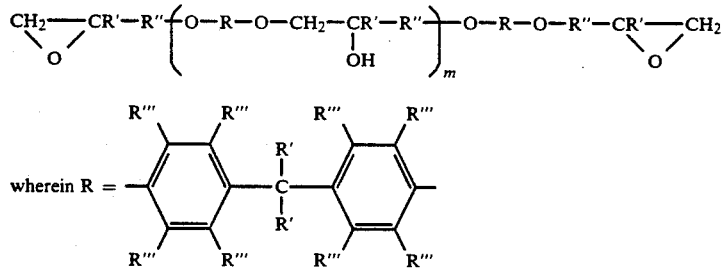

wherein
the groups R' may be the same or different and the groups R''' may be the same or different and
R' represents hydrogen or $-C_nH_{2n+1}$,
R'' represents $-(CR^1)_n-$, wherein R' is defined as above,
R''' represents hydrogen, $-C_nH_{2n+1}$ or halogen, preferably hydrogen,
m = 0 to 6,
n = 1 to 3.

The particularly preferred binders (A) are reaction products of epichlorohydrin with dihydroxydiphenyl methane (bisphenol F) or dihydroxydiphenyl propane (bisphenol A). Polyepoxides of suitable molecular weight are obtained either through appropriate choice of the reaction conditions in the reaction of bisphenol with epichlorohydrin or by reaction of a low molecular weight diglycidyl compound with more bisphenol and/or monophenol and/or polyalcohol, such as hexane-1,6-diol, polytetrahydrofuran diol, polycaprolactone diol, polycaprolactam diol or polybutadiene diol, or monoalcohol in the presence of suitable basic or acidic catalysts. The introduction of amino groups into the particularly preferred binder (A) may be obtained, for example, by addition of NH-reactive compounds onto the epoxide groups or by reaction of the hydroxyl groups of the basic resin with basic monoisocyanates formed by reaction of aromatic and/or aliphatic and/or cycloaliphatic di- or polyisocyanates with dialkylaminoalcohol (DE-A 27 07 405). The NH-reactive compounds used may be primarily monoalkylamines, such as dialkyl aminoalkylamine, and/or preferably secondary monoamines, such as dialkylamines, monoalkyl hydroxyalkylamines or dihydroxyalkylamines. Examples of suitable compounds are diethylamine, dimethyl aminopropylamine, N-methyl aminoethanol, diethanolamine or the diketimine of diethylenetriamine. Where primary amines or secondary diamines are used, chain extension occurs. Other suitable secondary diamines are alkyl diaminoalkanes or reaction products of saturated glycidyl ethers with primary diaminoalkanes. The binder (A) preferably contains an average of at least 2, preferably at least 3 and, more preferably, at least 4 cationic or anionic groups per molecule.

As mentioned above, examples of anionic or cationic binders (B) which are preferably used in solid form, for example particle form, together with the oppositely charged examples for (A), as given above, in the coatings or binder combinations (A) and (B) according to the invention are given in the following.

Binders having a glass transition temperature in the range from 40° to 250° C., preferably in the range from 50° to 150° C. and more preferably in the range from 50° to 130° C. are generally used as binder (B). Binder (A) either has glass transition temperatures in the same range or is present in liquid or dissolved form and does not dissolve or swell binder (B) under storage and application conditions.

One preferred method for the production of binder (B) in particle form is the emulsion polymerization of acrylic compounds and/or vinyl compounds or acrylic compounds and/or vinyl compounds with styrene and/or styrene derivatives. Resin and paint powders which have been ground to particle sizes of, for example, below 15 μm are also very suitable for binder (B). The following are examples of binders which may be used for (B):

polycondensation, polyaddition and/or polymerization products having a number average molecular weight of at least 2,000 g/mol, preferably of at least 5,000 g/mol, more preferably of at least 50,000 g/mol and most preferably of at least 100,000 g/mol. There is no restriction on the upper limit which may be, for example, at $10^7$ g/mol. (The terms polycondensation, polyaddition and polymerization are defined in Winnacker-Küchler, "Chemische Technologie" Vol 6 Organische Technologie II, Carl Hanser Verlag München - Wien 1982, pages 313 to 323).

The binders (B) may advantageously be produced as homopolymers or copolymers by emulsion polymerization, suspension polymerization, bulk polymerization and solution polymerization, as described in Winnacker-Küchler, "Chemische Technologie", Vol. 6, Organische Technologie II, Carl Hanser Verlag München-Wien 1982, pages 775 to 787. Emulsion polymerization and suspension polymerization are particularly preferred for the production of the binders (B).

The binders (B) contain anionic or cationic groups as functional groups. The binders (B) may contain as anionic groups for example carboxyl groups, sulfonic acid groups, phosphonic acid groups and phenolic hydroxyl groups.

The acid groups are introduced into the binder (B), for example, by polymerization to the homopolymer or copolymer and/or by polymer-analog reactions on suitable polymers by, for example, unsaturated acids, such as (alk)acrylic acid, crotonic acid, iraconic acid, maleic acid, maleic anhydride, fumaric acid, phthalic anhydride or hydrogenation products thereof, sulfoethyl (meth)acrylate, amidomethyl propanesulfonic acid (AMPS) or vinyl phosphonic acid.

Other suitable monomers capable of introducing anionic groups into the binder are, for example, unsaturated compounds such as, for example, phenols having unsaturated chains on the aromatic ring, such as vinyl phenols, or monomers in which acidic groups can be formed during or after the polymerization, such as 4-hydroxystyrene acetate for example.

It is also possible to use products obtained by formation of a copolymer or homopolymer with hydroxyalkyl (meth)acrylate and complete or partial reaction of the hydroxyl groups with acid anhydrides of di- or polycarboxylic acids, such as maleic anhydride, phthalic anhydride or hydrogenation products thereof. Suitable cationic groups are, for example, primary, secondary, tertiary amino groups, quaternary ammonium groups, pyridine groups, pyridinium groups, sulfonium groups and phosphonium groups.

The basic groups may be introduced into the binder, for example, by homopolymerization or copolymerization of unsaturated amines, such as for example dimethyl aminoacrylate, allylamine, vinyl pyridine and derivatives thereof, and/or by polymer-analog reactions on suitable polymers. It is also of advantage to prepare a copolymer or homopolymer with glycidyl (meth)acrylate and completely or partly to react the epoxide groups with secondary amines, including the diketimine of diethylenetriamine and/or with salts of tertiary amines, for example with dimethylamine lactate.

The average number of functional groups in the molecule depends upon the reactant. However, whereas crosslinking may be obtained by covalent crosslinking even when the molecules of one of the reaction components contain on average at least two functional groups while the molecules of the other reaction component contain on average at least three functional groups, more functional groups per molecule are required for crosslinking through ion pair bonds. The binder (B) should contain on average at least 5, preferably at least 15 and, more preferably, at least 30 functional groups per molecule.

The binders (B) are preferably and best used in the form of an aqueous or non-aqueous dispersion, for example as obtained during their production, or in the form of a powder, for example after spray drying of a dispersion, or in the form of a ground synthetic resin or paint powder. The particle size of the binder (A) or (B), more especially (B), before application is from 0.05 to 15 µm, preferably from 0.05 to 2 µm and more preferably from 0.1 to 2 µm. Monodisperse and polydisperse distributions of the particles are both suitable. The production of other suitable binders (B) in the preferred particle form may be carried out in principle in the same way as described for binder (A), providing the binders obtained in this way may be used in finely divided solid form.

The binders (A) and (B) described by way of example in the foregoing are present in the coating composition in a ratio by weight of 90-10% binder (A) to 10-90% binder (B), preferably 75-25% binder (A) to 25-75% binder (B) and, more preferably, 60-40% binder (A) to 40-60% binder (B).

The binder combinations or coating compositions according to the invention may contain standard additives, although they must not cause any interdiffusion of components (A) and (B) before baking.

For example, in addition to binders (A) and (B), the curable coating compositions may optionally contain other paint raw materials which need not be ionic, such as for example binders, plasticizers, pigments, fillers, paint powders, resin powders, additives (foam inhibitors, anticrater agents, adhesion promoters, flow control agents, catalysts, etc.) and organic solvents.

Suitable organic solvents are those which dissolve or swell only one of the components under storage and application conditions. Preferred auxiliary solvents for use in electrodeposition coating baths, particularly cationic electrodeposition coating baths, are, for example, hexyl glycol, butyl glycol, 2,2,4-trimethylpentane-1,3-diol monoisobutyrate or mixtures thereof.

Although not necessary, the addition of heavy metal compounds, for example as curing catalysts, is possible in principle. Standard crosslinking agents do not have to be used either. However, other crosslinking agents such as, for example, urea resins, triazine resins, phenolic resins, blocked isocyanates, transesterifiable and transamidatable crosslinking agents, acetal-functional crosslinking agents and urea condensates (for example according to DE-A 33 25 061), may optionally be added.

It has long been known that a combination of various crosslinking agents of varying reactivity can produce a number of improvements in paints. Where coating compositions according to the invention are used as water-dilutable paints, standard neutralizing agents are used, for example for binder (A), such as inorganic and organic acids where binder (A) contains basic groups, or alkali hydroxides, amines, alkanolamines and ammonia where binder (A) contains acidic groups. Formic acid, acetic acid, propionic acid, lactic acid, gallic acid, phosphoric acid, alkylphosphoric acids and carbonic acid are preferably used.

Other acidic compounds which, chemically, do not directly belong to the group of acids, such as phenols, for example pyrogallol, may also be used. Preferred basic neutralizing agents are amines and alkanolamines having a molecular weight of up to 200 g/mol and, more preferably, of up to 150 g/mol.

The binder combinations or coating compositions according to the invention are suitable for various methods of application. For example, they may be applied to the surface of suitable workpieces by known methods of painting, such as spray coating, roller coating, spread coating, dip coating, roll coating and electrodeposition coating. The film of coating material is cured by baking at 80° to 250° C.

One preferred way of application is electrodeposition. Electrodeposition is carried out in an aqueous dispersion. It is necessary that one of resin components (A) or (B) is particulate. The second component is preferably dispersable in water. It can be necessary to add acids or bases in order to achieve dispersability of the liquid component. If, for example, the dispersable component contains amino groups, it will be necessary to add an acid. It is desirable to achieve a homogeneous distribution of components (A) and (B) in the aqueous dispersion. Without being bound to the following theory it is supposed that the particulate component is coated by the liquid disperse component, furnishing a coated particle having an external uniform charge which enables electrodeposition from the aqueous dispersion. It is for example possible to achieve the homogeneous distribution of resin (A) and resin (B) by grinding of both components (A) and (B) in an aqueous medium in a usual grinding device. Examples for such grinding devices are ballmills, like ballmills with stirring device, beadmills etc. A part of the liquid resin (A) and (B) can be used in excess. The dispersed binders can be modified by usual additives and/or pigments which are used normally in electrodeposition coatings. From such bath the coatings may be deposited on a substrate with high electric conductivity, e.g. steal or aluminium by the usual electrodeposition process. The substrate is then heated and handled in the usual way.

The cured film obtained in this way may be used as a substrate for further coatings. Further coatings can be applied by a wet-in-wet process in a wet or predried state or after curing of the electrodeposited coating.

The advantage of using the coating compositions according to the invention is that, theoretically, no cleavage products are formed and hardly any isocyanate compounds and heavy metal compounds need be used. One particular advantage in regard to the painting of car bodies is the outstanding chip resistance obtained with coatings according to the present invention. The crosslinking of the stored coating at room temperature affords all the advantages of covalent crosslinking, but is reversible. Individual points of the crosslinked structure formed can be opened again at high temperatures, for example above 100° C., depending on the ion concentration and the substrate polymer. This property affords the advantage that the adhesion of thermally crosslinking following layers is distinctly improved.

A further advantage is provided by the possibility to use binders which are not compatible with each other even after curing by heating. In accordance with the invention, it is possible to introduce ionic groups of different charges into such binders and to form a homogeneous clear coating by heat-curing.

Thus, e.g. a mixture of polystyrene and polybutadiene oil forms an inhomogenenous dull film even after heating to 150° C. If a polybutadiene oil (as a liquid binder) containing sufficient carboxylic groups and a polystyrene containing sufficient amino groups (as a resin powder) are applied to a substrate and heated to 150° C., a homogeneous clear film is formed.

Introduction of carboxylic groups into polybutadiene oil is possible e.g. by reaction of the oil with maleic anhydride and cleaving of the anhydride ring with water or methanol as usual for binders which are used in aqueous lacquers, e.g. anodic depositable electrodeposition coatings.

The introduction of amino groups into polystyrene can be carried out by copolymerization of styrene with vinyl pyridine. The introduction of ionic groups into only one single of the two binders, e.g. only into the polybutadiene oil, does not furnish compatibility of both fused binders. The necessary amount of each of the carboxylic groups and amino groups in both binders can easily be detected by corresponding tests.

The coating compositions according to the invention may be used as solventless and low solvent (high-solids) paints, non-aqueous dispersions (dispersions in organic liquids), water-dilutable paints and electrodeposition paints. The use in electrodeposition paints, especially such for cathodic deposition, is preferred. A further preferred embodiment is powder coating. The binder (A) is a synthetic resin, natural resin or modified natural resin containing basic or acidic groups. For use in water-dilutable paints, including electrodeposition paints, it may be dissolved or dispersed in water in known manner after neutralization or partial neutralization.

In the following Examples, all percentages are by weight, unless otherwise stated.

PRODUCTION EXAMPLES

Binder A1

In accordance with EP-A 82 291, pages 11, component A2, 190 g bisphenol diglycidyl ether (1 epoxide equivalent) and 1425 g bisphenol glycidyl ether (3 epoxide equivalents) are dissolved in 597 g 2-ethoxyethanol at 100° C. The solution is cooled to 60° C. and 126 g diethanolamine are added thereto. The temperature is slowly increased to 80° C. over a period of 2 hours. 169 g N,N-diethylpropane-1,3-diamine are then added and the temperature increased to 120° C. over a period of 2 hours. 478 g of the diglycidyl ester of a $C_9$-$C_{11}$ monocarboxylic acid, of which the carboxyl group is attached to a tertiary C atom, are added at that temperature, followed by stirring for 5 hours at 130° C. The reaction mixture is diluted with 2-ethoxyethanol to a resin content of 60%. The solid resin has an amine value of 91 (mg KOH/g) and a hydroxyl value of 265 (mg KOH/g).

Binder A2

In accordance with EP-B 12 463, 301 g diethanolamine, 189 g 3-(N,N-dimethylamino)-propylamine and 1147 g of an adduct of 2 mol hexane-1,6-diamine and 4 mol of the glycidyl ester of versatic acid are added to 5273 g bisphenol A epoxy resin (epoxide equivalent weight approx. 475) in 3000 g ethoxypropanol. The reaction mixture is stirred for 4 hours at 85°–90° C. and then for 1 hour at 120° C. It is then diluted with epoxypropanol to a solids content of 60%.

Binder A3

385 g binder A2 and 122 g crosslinking agent C1 are mixed and the solvent distilled off in vacuo at a temperature below 60° C. to a solids content of 85%. The product is then thoroughly mixed with 6.9 g acetic acid (100%) and 500 g deionized water (temperature approximately 35° C.) slowly added with stirring. The reaction mixture is then diluted with more water to a solids content of 33%.

Binder A4

A binder according to A2 is prepared with the demand that, on completion of the synthesis, the solvent is distilled off in vacuo. The product formed solidifies after cooling and has an amine value of approximately 80.

Binder B1 containing carboxyl groups

Emulsion polymerization is carried out by any of the standard methods described in Hölscher, Dispersionen synthetischer Hochpolymerer, Part 1, Springer Verlag 1969, Chapter 2.1.6:

A reaction mixture consisting of 25 g of a 30% alkanesulfonate solution in 875 g deionized water is introduced into a reactor. A pre-emulsion is prepared from 788 g deionized water, 108 g of a 30% alkanesulfonate solution, 1277 g styrene, 639 g acetoxystyrene and 144 g acrylic acid. The polymerization is carried out at 50° C. The initiator system (redox system) consists of 4 g hydrogen peroxide in 70 g deionized water and 4 g ascorbic acid in 70 g deionized water. 75 g of the pre-emulsion are added to the solution and polymerization is initiated by the addition under nitrogen at 50° C. of one quarter of the initiator solution. The rest is added over a period of 3 hours.

After the initiator solution has been added, a redox system of the same constituents as before is added over a period of 1 hour. A finely divided, coagulate-free dispersion having a solids content of 50% is obtained.

Binder B2 containing carboxyl groups

An emulsion polymerization is carried out in the same way as for binder B1, but with the following quantities of monomers: 1200 g styrene, 800 g acetoxystyrene and 60 g acrylic acid.

Binder B3

The emulsion polymerization is carried out by any of the standard methods mentioned in the Example for binder B1. A reaction mixture consisting of 15 g of an alkyl trimethyl ammonium chloride in 975 g deionized water is introduced into the reactor. A monomer solution is prepared from 543 g styrene and 17 g acrylic acid. The initiator solution consists of 1 g of a water-soluble azo compound in 50 g deionized water. The polymerization is initiated at 80° C. by addition of 50 g of the monomer solution and 20 g of the initiator solution. The remaining quantities are added simultaneously over a period of 3 hours. Polymerization is carried out for another 2 hours at 80° C.

Binder B4

An emulsion polymerization is carried out in the same way as in Example B3, except that methacrylic acid is used instead of acrylic acid.

Binder B5

As binder B3, but with 326 g styrene, 217 g acetoxystyrene and 17 g acrylic acid as monomers.

Binder B6

As binder B5, but with methacrylic acid instead of acrylic acid.

Binder B7

As binder B3, but with 543 g acetoxystyrene and 17 g acrylic acid as monomers.

Binder B8

As binder B7, but with methacrylic acid instead of acrylic acid.

Binder B9

As binder B3, but with 504 g acetoxystyrene and 56 g acrylic acid.

Binder B10

As binder B9, but with methacrylic acid instead of acrylic acid.

Binder B11

As binder B3, but with 476 g acetoxystyrene and 84 g acrylic acid as monomers.

Binder B12

As binder B11, but with methacrylic acid instead of acrylic acid.

Binder B13

As binder B3, but with 476 g acetoxystyrene, 42 g methacrylic acid and 42 g acrylic acid.

Binder B14

As binder B3, but with 112 g methacrylic acid and 448 g methyl methacrylate as monomers. The emulsion formed is spray-dried to a non-tacky powder.

Binder B15

1 mol glycerol, 2.8 mol propylene glycol and 0.4% zinc acetate, based on the formulation as a whole, are carefully heated to 120° C. in a gentle stream of nitrogen in an apparatus consisting of a reaction flask, an effective stirrer, a column, a distillation bridge, a receiver and thermometers for controlling the temperature of the mixture and the temperature of the vapor. 2 mol dimethyl terephthalate are added, followed by heating to 175° C. The mixture is then heated to 220° C., methanol distilling off; the boiling temperature should not exceed 65° C.

The temperature is maintained until around 90% of the theoretical quantity of methanol has been removed. The density of the destilled liquid sould be 0.792–0.799 g/ml (20° C.). In the event of a higher density, a corresponding proportion of propylene glycol should be added to the reaction mixture. The reaction mixture should then be cooled to 160°–180° C. 0.37 mol adipic acid and 1 mol isophthalic acid are then added, followed by slow heating to 210° C. At 210° C., the reaction mixture is esterified until a melting range of 50°–55° C. (Kofler bench) is reached. If this value has not been reached after 3 hours, the reaction is continued under a light vacuum (500 mbar).

Beyond a melting range of 50°–55° C., the reaction mixture is condensed in a vacuum of 150 mbar. After a melting range of 70° to 75° C. has been reached, the vacuum is removed, nitrogen is passed over and the reaction mixture is cooled to 170°–175° C. The polyester formed should now have an acid value of 5 to 10. The acid value of the polyester is adjusted to approximately 100 by addition of 0.125 mol phthalic anhydride. After stirring for 30 minutes, the molten resin can be poured off.

Crosslinker C1

160 g caprolactam are slowly added under stirring at 70° C. to 431 g of a solution (75% in ethyl acetate) of a reaction product of 3 mol tolylene diisocyanate with 1 mol trimethylol propane (Desmodur L$^{(R)}$). The reaction mixture is then kept at 70° C. until the NCO content has fallen to substantially zero.

Pigment Paste P1

220 g of a pigment grinding vehicle according to Example 5 of EPA 0 183 025 (90%) are homogeneously mixed with 9.6 g acetic acid (100%) and the resulting mixture diluted with 1790 g deionized water. 600 g of an emulsion polymer according to Example B14 are added under stirring into the resulting solution which is then ground to the necessary particle size in a bead mill. The pigment paste has a solid content of approximately 31%, is stable and of low viscosity.

Pigment Paste P2

220 g of a pigment grinding vehicle according to Example 5 of EPA 0 183 025 are mixed with acetic acid (10.8 g 100%) and the resulting mixture diluted with 1790 g deionized water. 500 g of an emulsion polymer according to Example B14 and 35 g dibutyltin dioxide are added to the resulting solution which is then ground to the necessary particle size in a bead mill. The pigment paste has a solids content of approximately 28% and is of low viscosity.

EXAMPLE 1

550 g binder A1 are thoroughly mixed with 17 g formic acid, 50% in deionized water, 12 g carbon black and 333 g binder B1 in a high-speed dissolver and the resulting mixture ground in a bead mill; the temperature of the material being ground must not exceed 30° C. After grinding, the product is diluted with ionized water to a total volume of 3 l. 90 g of a mixture of 50% 2-butoxyethanol and 50% 2,2,4-trimethylpentane-1,3-diol monoisobutyrate are then added. A cathodic electrodeposition paint bath (CED bath) is obtained. After stirring overnight, zinc-phosphated steel plates are cathodically coated for 4 minutes at a bath temperature of 30° C. and at a deposition voltage of 150 volts. The plates are baked for 25 minutes at an oven temperature of 180° C. The baked coating is smooth and elastic. The thickness of the coating is 21 to 23 μm.

EXAMPLE 2

3 l of a CED bath are prepared as described in Example 1 from 672 g binder A1, 21 g formic acid, 50% in water, 62.5 g titanium dioxide, 1.5 g carbon black, 200 g binder B2 and 2043 g deionized water. 45 g hexyl glycol are stirred into the bath. Zinc-phosphated steel plates are cathodically coated at a deposition voltage of 240 volts and at a resistance of 200 ohm and baked for 20 minutes at 185° C. The baked coating is smooth and elastic and has a thickness of 20 to 22 μm.

EXAMPLE 3

508 g binder A1 are thoroughly mixed with 16 g formic acid, 50% in water, 46 g titanium dioxide, 1 g carbon black and 152 g binder B2 in a high-speed dissolver and the resulting mixture ground in a bead mill; the temperature of the material being ground must not exceed 30° C. After grinding, 277 g deionized water are added. The lacquer is applied by a doctor blade onto zinc-phosphated steel plates in a wet film thickness of 65 μm and baked for 25 minutes at 180° C. The baked film is smooth, glossy and elastic. The same results are obtained where binder A2 (508 g) is used instead of binder A1.

EXAMPLES 4 to 14

CED baths are prepared and steel plates coated and baked as in Example 2, except that binders B3 to B13 are used instead of binder B2. All the baked coatings are hard and elastic.

EXAMPLE 15

The procedure is as in Example 2, except that the 672 g binder A1 are replaced by a mixture of 336 g binder A1 and 336 g binder A2. A smooth and elastic coating is again obtained after stoving.

EXAMPLE 16

675 g of the binder according to Example A1 are mixed with 9.0 g acetic acid and then slowly and thoroughly with 816 g deionized water.

1333 g of this emulsion are diluted with 500 g deionized water, followed by the gradual addition of 774 g of pigment paste P1. The product is diluted with deionized water to a solids content of 20%. The baked coatings give homogeneous and elastic films.

EXAMPLE 17

1273 g of a dispersion according to Example A3 are mixed with 1146 g deionized water, followed by the gradual addition of 581 g of pigment paste P1. The CED bath is adjusted with hexyl glycol to standard coating conditions. Coated plates are baked for 25 minutes at 150° C. and give a smooth elastic film.

EXAMPLE 18

1273 g of a dispersion according to Example A3 are mixed with 1000 g deionized water, followed by the gradual addition of 585 g of a pigment paste P2. The lacquer is adjusted with hexyl glycol to standard coating conditions. Coated plates are baked for 20 minutes at 160° C. and give a smooth elastic film.

EXAMPLE 19

The resins of Example A4 and B15 are separately dry-gound in known manner to a particle size of <40 μm. The two powders formed are mixed homogeneously with one another in a ratio by weight of 53:47 A4:B15. The resulting mixture may be applied electrostatically using standart application units. After baking at 150° C., a compact, smooth paint film is formed on the surface of the substrate.

We claim:

1. A process for producing a coating, which comprises applying by electrodip coating an electrically conducting substance to a thermosetting coating composition containing
   (A) one or more binders in liquid or dissolved form containing acidic groups, basic groups, or ionic groups of like charge, having a number average molecular weight of from 300 to 10,000 g/mole,
   (B) one or more binders in solid, particulate form under application and storage conditions and having a number average molecular weight of at least 50,000 g/mole, and containing at least 15 basic groups per molecule when (A) contains acidic groups, or at least 15 acidic groups per molecule when (A) contains basic groups, or at least 15 ionic groups per molecule of the same charge which is opposite to the sign of the charge of the ionic groups of (A),
   wherein both binders (A) and (B) are present in particulate form.

2. A thermosetting coating composition containing
   (A) one or more binders in liquid or dissolved form containing acidic groups, basic groups, or ionic groups of like charge, having a number average molecular weight of from 300 to 10,000 g/mole,
   (B) one or more binders in solid, particulate form under application and storage conditions and having a number average molecular weight of at least 50,000 g/mole, and being convertable into liquid or dissolved form at least at a curing temperature and containing at least 15 basic groups per molecule when (A) contains acidic groups, or at least 15 acidic groups per molecule when (A) contains basic groups, or at least 15 ionic groups per molecule of the same charge which is opposite to the sign of the charge of the ionic groups of (A), the binder (B) being non-interdiffusible under storage and application conditions, but being interdiffusible, with the binder (A) under curing conditions.

3. The thermosetting coating composition of claim 2, wherein the binder (A) is present of from 10–90% by weight and the binder (B) is present at from 90 to 10% by weight.

4. The thermosetting coating composition of claim 2, wherein the binder (B) is insoluble in the binder (A) under storage and application conditions, said binder (B) is non-swellable.

5. The thermosetting coating composition of claim 4, wherein the binder (B) contains at least thirty cationic or anionic groups per molecule.

6. The thermosetting coating composition of claim 2, in which both binders (A) and (B) are in particulate form.

* * * * *